Oct. 11, 1949.                H. E. HINZ                2,484,345
                        TELEVISION TUBE SUPPORT
                          Filed June 29, 1948

INVENTOR.
HENRY E. HINZ
BY

Patented Oct. 11, 1949

2,484,345

UNITED STATES PATENT OFFICE 2,484,345

TELEVISION TUBE SUPPORT

Henry E. Hinz, Maywood, Ill.

Application June 29, 1948, Serial No. 35,850

7 Claims. (Cl. 250—141)

This invention relates to improvements in television receivers, and more particularly relates to an improved mounting for television receiver viewing tubes.

As is well known to those versed in the art, commercially made television receivers include a receiver chassis which houses and supports the receiver components. As a matter of convenience, the viewing tube is also usually supported by the chassis. The chassis and the tube are then placed in a cabinet which is provided with a viewing window through which the screen of the receiver tube may be viewed.

Inasmuch as the viewing tube is a somewhat awkward piece of apparatus to handle because of its enlarged viewing screen end, and is also delicate, it has always been a problem to mount the same. Furthermore, since the same chassis may be used in cabinets of different types, the mounting thereof becomes more difficult since it is often desirable to provide some form of adjustment which will enable the viewing or screen end of the tube to be moved for proper alignment of the screen with the viewing window.

It is further important that the mounting be such that it will not have any affect on the operation of the tube itself, and, that it be such that the support of the tube will assist in preventing shocks being transmitted to the tube and thus causing breakage.

By my present invention, I have provided a television receiver tube mounting which provides a high degree of shock-proof mounting for the tube. Furthermore, the mounting is such that it readily may acccommodate tubes having variations in contours such as are encountered when tubes are obtained from different manufacturers. The mounting is also such that the tube is securely supported, being gripped at points where the greatest pressure may be applied without liability of damage to the tube.

The mounting is such that a variety of adjustments may be realized for adjusting the position of the screen, such as height, lateral position, and nearness to the screen. Also, the device is such that tubes may be readily replaced or removed by persons with a minimum of skill and the liability of breakage of the tube, when it is secured in place, is reduced to a minimum. The breakage of the tube is an important factor, both from the standpoint that the tube is very expensive and, what is probably more important, if breakage does occur, it is usually accompanied by a loud and violent explosion with danger to the personnel from flying glass.

Still other advantages of my invention and the invention itself will become more apparent from the following description of an embodiment thereof, which description is illustrated by the accompanying drawings and forms a part of this specification.

Figure 1:
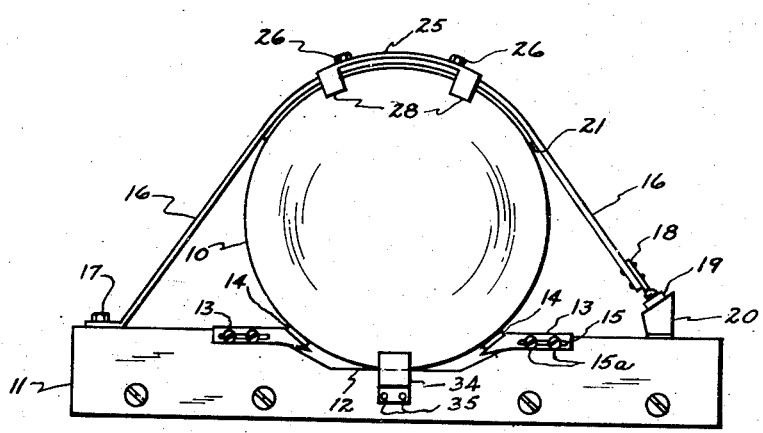
Fig. 1 is a front elevation of the tube mounted in my mount.

Referring to the drawings, throughout which like parts are designated by like reference characters and more particularly to Fig. 1, my mount consists generally of a pair of supports at the bottom of the tube, a strap over the top of the tube and a spring loaded retainer over the top front edge of the tube.

As shown in Fig. 1, a chassis 11 is provided, and the tube 10 is placed on the forepart of the chassis which has been cut out with a trapezoidal opening at 12 to allow the large end of the tube 10 to rest therein, this being preferable for reasons of reducing the size of the assembly. The lower forepart of the tube is supported by a pair of lower supports 13 which are adjustable on the chassis toward and from each other. These supports are of angular cross section and are mounted on the front edge of the chassis to support the bottom of the tube. The supports are secured to the chassis on either side of the trapezoidal opening by screws 15a which extend through slots 15 in the brackets and are threaded into the front wall of the chassis. Each of the brackets is provided with slanting inner ends which extend at an angle and tangential to the tube periphery to allow the tube to rest thereon. Rubber buffer, or shock pads 14, are provided on the slanting ends of the supports to prevent metal-to-glass contact, thus minimizing the danger of breakage. By this structure slight adjustments of the tube to center it in the opening in the cabinet (not shown) are provided since the supports may be moved laterally completely independent of each other. This feature makes possible adjustment of the tube vertically, raising the tube by bringing the two supports together and lowering it by separating the supports either to the right or left.

The tube is held seated on the pads 14 by a retaining support comprising a strap 16 and its end fastening means. The strap is disposed over the upper rim of the enlarged part of the tube. This strap may be made of a thin sheet metal and is fastened permanently to the chassis at its one end by bolts or rivets 17. A rubber strip 21 of wedge shaped cross section is disposed between the strap 16 and the tube 11 to protect the tube from breakage. The fastening means at the other end of the strap comprise a spade bolt 18 permanently fastened thereto, a threaded bushing 19, and an anchor bracket 20 mounted on the chassis. The threaded bushing 19 may be screwed onto the spade bolt and may be of hexagonal cross section in order that it may be easily tightened or released with an ordinary wrench. A peripheral groove 19a is cut in this bushing at its mid-section to fit the slot in the anchor bracket 20 as hereafter described.

The anchor bracket 20 is formed in the shape of an inverted channel and is mounted on the chassis with its open ends traversely of the chassis. The top of the inverted channel section is sloped so that it is substantially perpendicular to the spade bolt 18 when the bolt is inserted into the bracket. A slot is cut in the top of the bracket 20 of such dimensions that the groove 19a in the bushing 19 will smoothly fit therein. Thus, to fasten the strap securely, the bushing need only be slipped into the slot and tightened on the spade bolt until the desired tension in the strap is reached.

The support of the mid-section of the tube is accomplished by a single support means. This means comprises a support bracket 22 which is adjustably supported by bolts 40 which extends through slots 41 in this bracket, in which a hole has been punched to receive the tube. The edges 23 of this hole are flanged back at approximately the angle of taper of the sides of the tube to provide additional support, and a rubber gasket 24 is provided to prevent metal-to-glass contact at this point. This bracket is mounted on the chassis at such a place that when the tube 10 is inserted through the hole and pressed back lightly, the front of picture tube 10 is at the front of the chassis.

To prevent fore and aft movement of the tube, a bracket 25 is provided which operates in connection with the support bracket 22. The bracket 25 is formed with a pair of slots 27 which engage two bolts or studs 26 which may be permanently fastened to the strap 16. Tightening of nuts on these studs provides a positioning of the two parts relative to each other facilitating the assembly as hereinafter described. Lugs 28 are formed on the bracket to extend over the face of the tube but are not so long as to protrude into the useful portion. Rubber buffer pads 29 are again provided between the clips and the tube to protect the tube. A spring 30 hooked through a hole 31 in the bracket 25 and also connected to the support bracket 22, urges the lugs 28 against the face of the tube and also thereby urges the tube back into the debossed hole in the support bracket, thus providing a firm support for the tube but not one so absolutely rigid that it might cause breakage.

Figure 2:
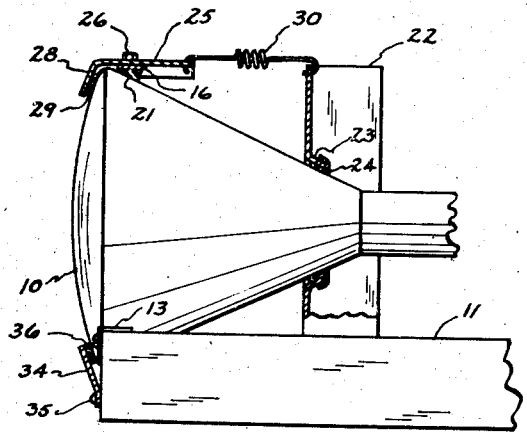
Fig. 2 is a side elevation.
Figure 3:
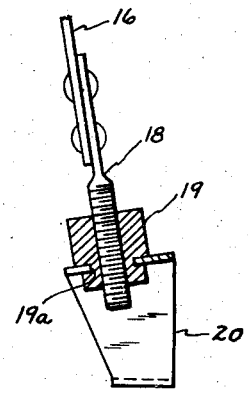
Fig. 3 is a detail showing one adjusting device.
Figure 4:
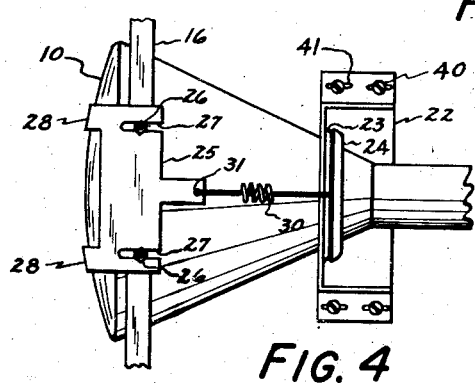
Fig. 4 is a top view.

To assemble the tube in position and fix it there, in my support, it is necessary only to insert the tube into its socket through the debossed hole in the support bracket 22. The strap 16 is placed over the top of the tube and the bracket 25 fixed thereon so that when the lugs 28 are firmly pressed against the face of the tube, the strap 16 with its rubber buffer 21 is over the largest part of the tube. The bushing 19 is then inserted into its slot in the anchor bracket 20 so that the strap 16 is snug on the top of the tube. The spring 30 may then be snapped into place between the bracket 25 and the support bracket 22. At this point any necessary adjustments may be made in the lower supports to center the tubes, and then the bushing is tightened in the anchor bracket to the desired tension to hold the tube firmly in place. The lugs 28 not only hold the tube against the bracket 22 but also hold the strap 16 in place, there being no possibility of its slipping down the tube. Disassembly and replacement of the tube can readily be accomplished simply by loosening the bushing, slipping it out of its slot and raising the strap enough so that the clips release the tube. It is thus apparent that I have provided a secure mounting for the tube at all times while still providing a simple means of assembly and disassembly. Optionally an additional bracket 34 may be riveted to the front of the chassis at 35. The bracket extends at an angle, as indicated at Fig. 2, and is provided with a rubber pad 36 for engagement with the front of the tube.

Having thus described my invention, I am aware that numerous departures may be made therefrom without departing from the spirit and scope thereof.

I claim:

1. A support for a television picture tube on a radio chassis comprising, in combination, lower support means on said chassis at the front of the tube, comprising a base on which the tube rests, mid section support means comprising a bracket mounted on said chassis near the mid section of said tube having a hole therein to receive the tube neck, top holding means comprising a strap over the large end of the tube fixed to the said chassis at one end and adjustably fastened to anchor bracket means at the other, said anchor bracket means being mounted on said chassis, front holding means comprising a bracket mounted on said strap, having lugs extending over the front edge of the tube and a spring means between the said mid section support means and said front holding means to urge the two said means together and thereby hold the tube firmly.

2. A support for a television picture tube on a radio chassis comprising, in combination, lower support means comprising a pair of bracket means slidably mounted on said chassis and having contact surfaces substantially tangential to the outer surface of the said tube, mid section support means comprising a bracket mounted on said chassis near the mid section of said tube having a hole therein to receive the tube neck, top holding means comprising a strap over the large end of the tube fixed to the said chassis at one end and adjustably fastened to anchor bracket means at the other, said anchor bracket means being mounted on said chassis, front holding means comprising a bracket mounted on said strap, having lugs extending over the front edge of the tube and a spring means between the said mid section support means and said front holding means to urge the two said means together and thereby hold the tube firmly.

3. A support for a television picture tube on a radio chassis comprising, in combination, lower support means comprising a pair of bracket means slidably mounted on said chassis and having contact surfaces substantially tangential to the outer surface of the said tube, mid section support means comprising a bracket mounted on said chassis near the mid-section of the tube having a hole therein to receive said tube, said hole having its edges flanged back to substantially the angle of slope of the sides of said tube, top holding means comprising a strap over the large end of the tube fixed to the said chassis at one end and adjustably fastened to anchor bracket means at the other, said anchor bracket means being mounted on said chassis, front holding means comprising a bracket mounted on said strap, having lugs extending over the front edge of the tube and a spring means between the said mid-section support means and said front holding means to urge the two said means together and thereby hold the tube firmly.

4. A support for a television picture tube on a radio chassis comprising, in combination, lower support means comprising a pair of bracket means slidably mounted on said chassis and having contact surfaces substantially tangential to the outer surface of the said tube, mid section support means comprising a bracket mounted on said chassis near the mid-section of the tube having a hole therein to receive said tube, said hole having its edges flanged back to substantially the angle of slope of the sides of said tube, top holding means comprising a strap over the large end of the tube fixed to said chassis permanently at one end and by adjustable means at the other end, said adjustable means comprising screw means on the end of said strap, a nut on said screw means, said nut having a peripheral groove, anchor bracket means fixed to said chassis, said bracket means having a slot for slidable engagement with said peripheral groove in said nut, front holding means comprising a bracket mounted on said strap, having lugs extending over the front edge of the tube and a spring means between the said mid section support means and said front holding means to urge the two said means together and thereby hold the tube firmly.

5. A support for a television picture tube on a radio chassis comprising, in combination, lower support means comprising a pair of bracket means slidably mounted on said chassis and having contact surfaces substantially tangential to the outer surface of the said tube, mid section support means comprising a bracket mounted on said chassis near the mid-section of the tube having a hole therein to receive said tube, said hole having its edges flanged back to substantially the angle of slope of the sides of said tube, top holding means comprising a strap over the large end of the tube fixed to said chassis permanently at one end and by adjustable means at the other end, said adjustable means comprising screw means on the end of said strap, a nut on said screw means, said nut having a peripheral groove, anchor bracket means fixed to said chassis, said bracket means having a slot for slidable engagement with said peripheral groove in said nut, front holding means comprising a clip bracket mounted on said strap by screws and having slots for said screws to provide for adjustment of said clip bracket, said clip bracket having clips over the front edge of the tube and a spring means between said mid-section support means and said front holding means to urge the two said means together and thereby hold the tube firmly.

6. A support for a television picture tube on a radio chassis comprising, in combination, lower support means on said chassis at the front of the tube, comprising a base on which the tube rests, mid-section support means comprising a bracket mounted on said chassis near the mid-section of said tube having a hole therein to receive the tube neck, top holding means comprising a strap over the large end of the tube fixed to the said chassis at one end and adjustably fastened to anchor bracket means at the other, said anchor bracket means being mounted on said chassis, front holding means comprising a bracket mounted on said strap, having lugs extending over the front edge of the tube and a spring means between the said mid-section support means and said front holding means to urge the two said means together and thereby hold the tube firmly, and buffer pads of soft resilient material at all points of contact between said tube and the support.

7. A support for a television picture tube on a radio chassis comprising, in combination, lower support means comprising a pair of bracket means slidably mounted on said chassis and having contact surfaces substantially tangential to the outer surface of the said tube, mid-section support means comprising a bracket mounted on said chassis near the mid-section of the tube having a hole therein to receive said tube, said hole having its edges flanged back to substantially the angle of slope of the sides of said tube, top holding means comprising a strap over the large end of the tube fixed to the said chassis at one end and adjustably fastened to anchor bracket means at the other, said anchor bracket means being mounted on said chassis, front holding means comprising a bracket mounted on said strap, having lugs extending over the front edge of the tube and a spring means between the said mid-section support means and said front holding means to urge the two said means together and thereby hold the tube firmly, and buffer pads of soft resilient material at all points of contact between said tube and the support.

HENRY E. HINZ.

No references cited.